United States Patent [19]

Aleshi

[11] Patent Number: 5,968,172
[45] Date of Patent: Oct. 19, 1999

[54] HARDWARE AND SOFTWARE TRIGGERED PROGRAMMABLE RESET CIRCUITRY FOR SERIAL COMMUNICATION DEVICE

[75] Inventor: Russoul Aleshi, Campbell, Calif.

[73] Assignees: Sony Corporation of Japan, Tokyo, Japan; Sony Electronics, Inc., Park Ridge, N.J.

[21] Appl. No.: 08/969,071

[22] Filed: Nov. 12, 1997

[51] Int. Cl.$^6$ ............................................. G06F 9/445
[52] U.S. Cl. ............................................. 713/1; 710/266
[58] Field of Search ............................ 713/1, 2; 714/23; 710/260, 261, 262, 263, 264, 265, 266, 267; 712/39, 40, 43

[56] References Cited

U.S. PATENT DOCUMENTS

| | | | |
|---|---|---|---|
| 4,419,737 | 12/1983 | Yamaura et al. | 364/900 |
| 4,570,215 | 2/1986 | Miura et al. | 364/140 |
| 4,807,185 | 2/1989 | Kamiya | 364/900 |
| 5,218,683 | 6/1993 | Jerrim et al. | 395/325 |
| 5,261,076 | 11/1993 | Shamshirian | 395/500 |
| 5,465,360 | 11/1995 | Milleer et al. | 395/700 |
| 5,469,563 | 11/1995 | Morita | 395/183.01 |
| 5,737,604 | 4/1998 | Miller et al. | 713/1 |
| 5,740,404 | 4/1998 | Baji | 395/494 |
| 5,784,625 | 3/1996 | Walker | 710/260 |

FOREIGN PATENT DOCUMENTS

| | | | |
|---|---|---|---|
| 0 426 366 A2 | 5/1991 | European Pat. Off. | G06F 1/24 |
| 62-210521 | 9/1987 | Japan | G06F 1/100 |
| 03119411 | 5/1991 | Japan | G06F 1/24 |

Primary Examiner—Joseph E. Palys
Assistant Examiner—Rijue Mai
Attorney, Agent, or Firm—Wagner, Murabito & Hao LLP

[57] ABSTRACT

Hardware and software triggered programmable reset circuitry for a serial communication device. The invention has particular use in conjunction with an IEEE 1394 standard serial communication device ("serial card") within a computer system. The serial communication device is for coupling with a peripheral component interface (PCI) bus of the computer system. The serial communication device provides a serial bus onto which other devices can connect. The present invention provides a reset circuit that is triggered by software and/or hardware. In one embodiment, the software triggering portion of the invention is triggered by three sources. A particular address range is predefined and software triggered accesses over this address range cause a reset on the serial card. Second, a predefined device ID pattern is presented to a device ID circuit causing the device ID circuit to generate a reset on the serial card. Third, software on the computer system can cause the processor to trigger a system reset thereby causing the serial card to be reset. Hardware reset can also originate from three locations. A push button on the computer system causes system reset, thereby causing the serial card to reset. Second, a push button on the serial card itself can directly cause the serial card to reset. Third, an external function generator can be applied to special taps on the serial card and thereby assert a reset signal of programmable period and duty cycle for resetting the serial card.

23 Claims, 6 Drawing Sheets

HARDWARE AND SOFTWARE TRIGGERED PROGRAMMABLE RESET CIRCUITRY FOR SERIAL COMMUNICATION DEVICE

BACKGROUND OF THE INVENTION

1. Field of the Invention

The present invention relates to the field of reset circuits for elements within a computer system. More specifically, the present invention relates to the field of reset circuits for a serial communication device for a computer system.

2. Related Art

Within computer systems, often peripheral and other devices are connected to the processor and memory using a specialized bus architecture. One such bus architecture is the peripheral component interconnect or PCI bus architecture. The PCI bus allows a number of various peripherals to be connected to a common processor and memory architecture within a computer system. The components of the PCI bus are typically referred to as "agents" of the PCI bus.

One type of peripheral device that can be coupled to a PCI bus architecture is a serial communication device. One type of serial communication device is described within the well known IEEE 1394 standard. Serial communication devices of the IEEE 1394 standard can be connected to a PCI bus and themselves provide a serial communication bus onto which other devices can be connected. Devices coupled to the serial communication bus can communicate with the processor or other agents of the PCI bus. When integrated within a computer system, as described above, the serial communication device is typically one of many agents coupled to the PCI bus. In this case, the serial communication device is treated by the PCI bus as any other bus agent.

The PCI bus provides a well known reset management function whereby if one of the agents of the PCI bus generates a reset signal over the PCI bus, all other agents of the bus, including bus controllers, are reset. This is useful to coordinate the reset of various agents that are coupled to the PCI bus. However, often it is the case that a particular agent coupled to the PCI bus becomes temporally disabled, e.g., "locked-up," and therefore is unable to generate a reset signal on behalf of itself or the PCI bus. In this instance, the device or agent becomes separated from the communication traffic of the other agents of the PCI bus or of the IEEE 1394 bus. It becomes unable to receive or transmit signals with respect to the PCI bus and/or the IEEE 1394 bus. In these cases, although the device needs to be reset, it is unable to reset itself due to its own disablement.

Prior art serial communication devices under the IEEE 1394 standard do not provide a mechanism that would allow reset by another device of the computer system. The IEEE 1394 standard provides a data called "nest packet" causing every agent on the IEEE 1394 bus to reset upon receiving this packet of data. Those agents that are locked up do are not reset.

Therefore, if a prior art IEEE 1394 serial communication device becomes disabled, the entire computer system needs to be hard reset, by asserting the system reset line. This method of resetting the IEEE 1394 serial communication device is disadvantageous because it requires manual initiation and therefore manual attention. It would be advantageous to provide a reset mechanism that could respond to an automatic triggering device. Moreover, typically the computer system, to operate normally, contains many software drivers and configuration software. After a hard reset of the computer system, these software drivers and application configuration software need to be loaded back into memory before the computer system is functional. This process is very time consuming to perform. Therefore, it becomes very problematic to perform a hard reset on the computer system each time the IEEE 1394 serial communication device requires a reset.

SUMMARY OF THE INVENTION

Accordingly, what is needed is a reset mechanism for an IEEE 1394 serial communication device that allows reset of this device alone without causing a total computer system reset. Further, what is needed is a reset mechanism for the IEEE 1394 serial communication device that can be triggered by an automatic process or another device or agent within the computer system. What is needed yet is a mechanism for providing a programmable reset signal to an IEEE 1394 serial communication device that can be programmed during product development so that the optimum reset pulse is found. The present invention provides for the above mentioned advantageous. These and other advantages of the present invention not specifically mentioned above will become clear within discussions of the present invention presented herein.

What is described is a hardware and software triggered programmable reset circuit for a serial communication device. The invention has particular use in conjunction with an IEEE 1394 standard serial communication device ("serial card") within a computer system. The serial communication device is for coupling with a peripheral component interface (PCI) bus of the computer system. The serial communication device provides a serial bus onto which other devices can connect. The present invention provides a reset circuit that is triggered by software and/or hardware. In one embodiment, the software triggering portion of the invention is triggered by three sources. A particular address range is predefined and software triggered accesses over this address range cause a reset on the serial card. Second, a predefined device ID pattern is presented to a device ID circuit causing the device ID circuit to generate a reset on the serial card. Third, software on the computer system can cause the processor to trigger a system reset thereby causing the serial card to be reset.

Within the present invention, hardware reset can also originate from three locations. A push button on the computer system causes system reset, thereby causing the serial card to reset. Second, a push button on the serial card itself can directly cause the serial card to reset. Third, an external function generator can be applied to special taps on the serial card and thereby assert a reset signal of programmable period and duty cycle for resetting the serial card.

More specifically, within a serial communication device having a physical communication layer circuit and coupled to a serial communication bus, embodiments of the present invention include a reset circuit comprising: a first manual operated device for asserting a first reset signal that resets the serial communication device, the first manual operated device mounted on the serial communication device; a pair of input ports mounted on the serial communication device and coupled to a first selector circuit for accepting a programmable reset pulse of programmable duration and programmable duty cycle, the programmable reset pulse for resetting the serial communication device; a second selector circuit for coupling and decoupling the first reset signal to and from the first selector circuit; wherein the first selector circuit is coupled to reset the physical communication layer circuit; and a circuit for generating a software reset signal in response to a software triggered event, the circuit coupled to the first selector circuit, wherein the serial communication device is configured to reset the serial communication bus.

Embodiments of the present invention include the above and wherein the circuit for generating a software reset signal comprises: a device identification circuit for receiving a sequence of bits representing a device identification and, in response to detecting a predefined pattern within the sequence of bits, for generating a second reset signal; an address range detector circuit for generating a third reset signal in response to a memory access within a predefined address range; and a third selector circuit for receiving the second reset signal, the third reset signal and a system reset signal and in response thereto for generating the software reset signal. Embodiments of the present invention include the above and wherein the serial communication device is an IEEE 1394 standard.

DETAILED DESCRIPTION OF THE INVENTION

In the following detailed description of the present invention, a reset circuit for resetting an IEEE 1394 serial communication device within a computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The reset circuitry of the present invention is situated within a serial communication device of a host computer system. A discussion of the host computer architecture is presented below to provide a framework in which the reset circuitry of the present invention operates.

HOST COMPUTER ARCHITECTURE

Much of a computer system's functionality and usefulness to a user is derived from the functionality of the peripheral devices. The rate at which data can be transferred among the various peripheral devices and the timeliness by which a peripheral device can reset, and thereby recover from a fault, often determines whether the computer system is suited for a particular purpose. Several types of bus architectures have been developed to facilitate peripheral communication on and with a host computer system. The PCI (peripheral component interconnect) bus is one such bus architecture. The PCI bus is developed to provide a high speed, low latency bus architecture from which a large variety of systems can be developed. In one embodiment, the reset circuitry of the present invention is implemented to operate in conjunction with a peripheral device that is suited for integration with a PCI bus.

Figure 1:
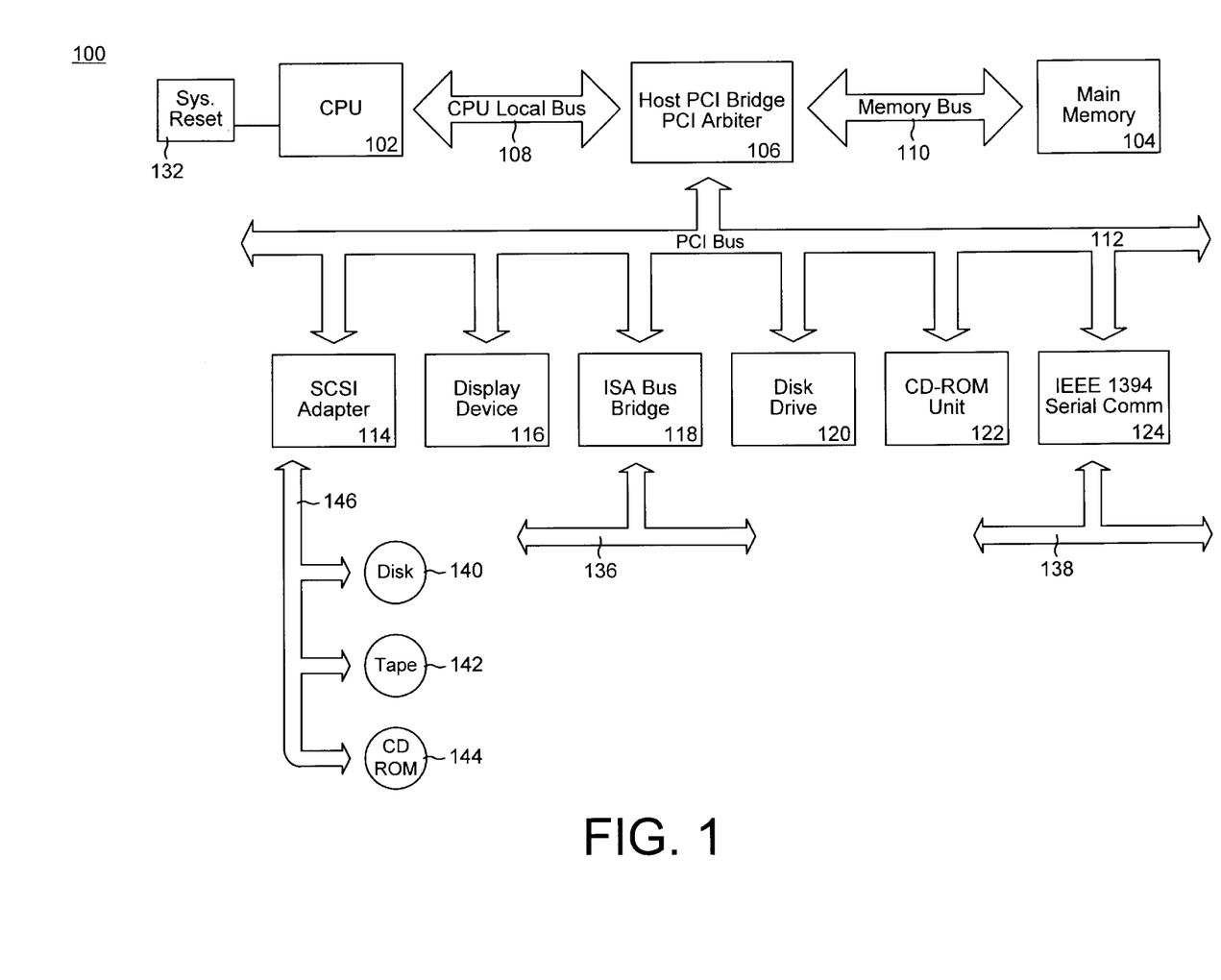
FIG. 1 illustrates a computer system embodiment in accordance with the present invention having a peripheral component interconnect bus and a serial bus.

FIG. 1 shows a host computer system 100 used in accordance with one embodiment of the present invention having a typical PCI bus architecture 112. Host computer system 100 is comprised of a processor (CPU) 102 and a main memory 104. Main memory 104 can be random access memory (RAM). The processor 102 and main memory 104 are coupled to a host PCI bridge containing PCI arbiter 106 (hereafter arbiter 106) through a CPU local bus 108 and memory bus 110, respectively. One or more read only memory (ROM) units can also be coupled to bus 110. A host bus (PCI bus) 112 is coupled to a number of peripheral devices, also called PCI agents, 114, 116, 118, 120, 122, 124 respectively, and is coupled to arbiter 106. The PCI agents 114, 116, 118, 120, 122, 124 can be removably connected to the PCI bus 112 via PCI slots. A manual operated push button reset circuit 132 is also shown in FIG. 1. When this manual device 132 is operated (e.g., depressed) by a user, a system wide reset of the computer system 100 is initiated. This manual device 132 is typically located in the front or back of a computer chassis that houses portions of computer system 100 and can be, in one embodiment, a push button device.

Each of PCI agents 114, 116, 118, 120, 122, 124 (hereafter, PCI agents 114–124) of FIG. 1 residing on PCI bus 112 uses PCI bus 112 to transmit and receive data with respect to other agents or the processor 102. PCI bus 112 is comprised of functional signal lines, for example, a PCI reset line, interface control lines, address/data lines, error signal lines, and the like. Each of PCI agents 114–124 are coupled to the functional signal lines comprising PCI bus 112. When one of PCI agents 114–124 requires the use of PCI bus 112 to execute a data transaction, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transaction (e.g., transfer a file). In the configuration shown in FIG. 1, agent 114 is a SCSI adapter that provides a SCSI line 146 onto which SCSI peripherals 140, 142 and 144 may be attached. Agent 116 is a display device, agent 118 is an ISA bus bridge providing an ISA bus 136, agent 120 is a disk drive and agent 122 is a CD-ROM unit. It is appreciated that with respect to the present invention, the above configuration of peripherals is exemplary only and within the scope of the present invention other peripherals can be substituted for the above listing or some replaced altogether.

In accordance with the present invention, one of the agents of PCI bus 112 is a serial communication device 124 or "card" that provides a serial bus 138 onto which other peripheral devices can be coupled. In one embodiment of the present invention, except as described differently herein with respect to reset circuitry 200 of FIG. 2, the serial communication device 124 conforms to the well known IEEE 1394 standard.

Within system 100 of FIG. 1, one or more of the PCI agents can initiate a PCI bus 112 reset by asserting a PCI reset over a reset control line of the PCI bus 112. When this occurs, all agents 114–124 of PCI bus 112 are reset. In accordance with the present invention, several mechanisms are presented so that the processor 102 and any agent on PCI bus 112 can initiate a reset of the serial card 124.

Each of PCI agents 114–124 may independently request PCI bus ownership. Thus, at any given time, several of PCI agents 114–124 can be requesting PCI bus ownership simultaneously. Where there are simultaneous requests for PCI bus ownership, PCI arbiter 106 arbitrates between requesting PCI agents, determining which requesting PCI agent is granted PCI bus ownership. When one of PCI agents 114–124 is granted PCI bus ownership, it initiates its transaction (e.g., file transfer) with a "target" or slave device (e.g., main memory 104). When the data transaction is complete, the PCI agent relinquishes ownership of PCI bus 112, allowing arbiter 106 to reassign PCI bus 112 to another requesting PCI agent.

Only one data transaction can take place on a PCI bus 112 at any given time. In order to maximize the efficiency and data transfer bandwidth of PCI bus 112, PCI agents 114–124 follow a definitive set of protocols. These protocols are designed to standardize the method of accessing, utilizing, and relinquishing PCI bus 112, so as to maximize its data transfer bandwidth while ensuring interoperability among various PCI bus devices from various manufacturers. The PCI bus protocols and specifications are set forth in the well known industry standard PCI specification.

RESET CIRCUITRY OF THE PRESENT INVENTION

Figure 2:
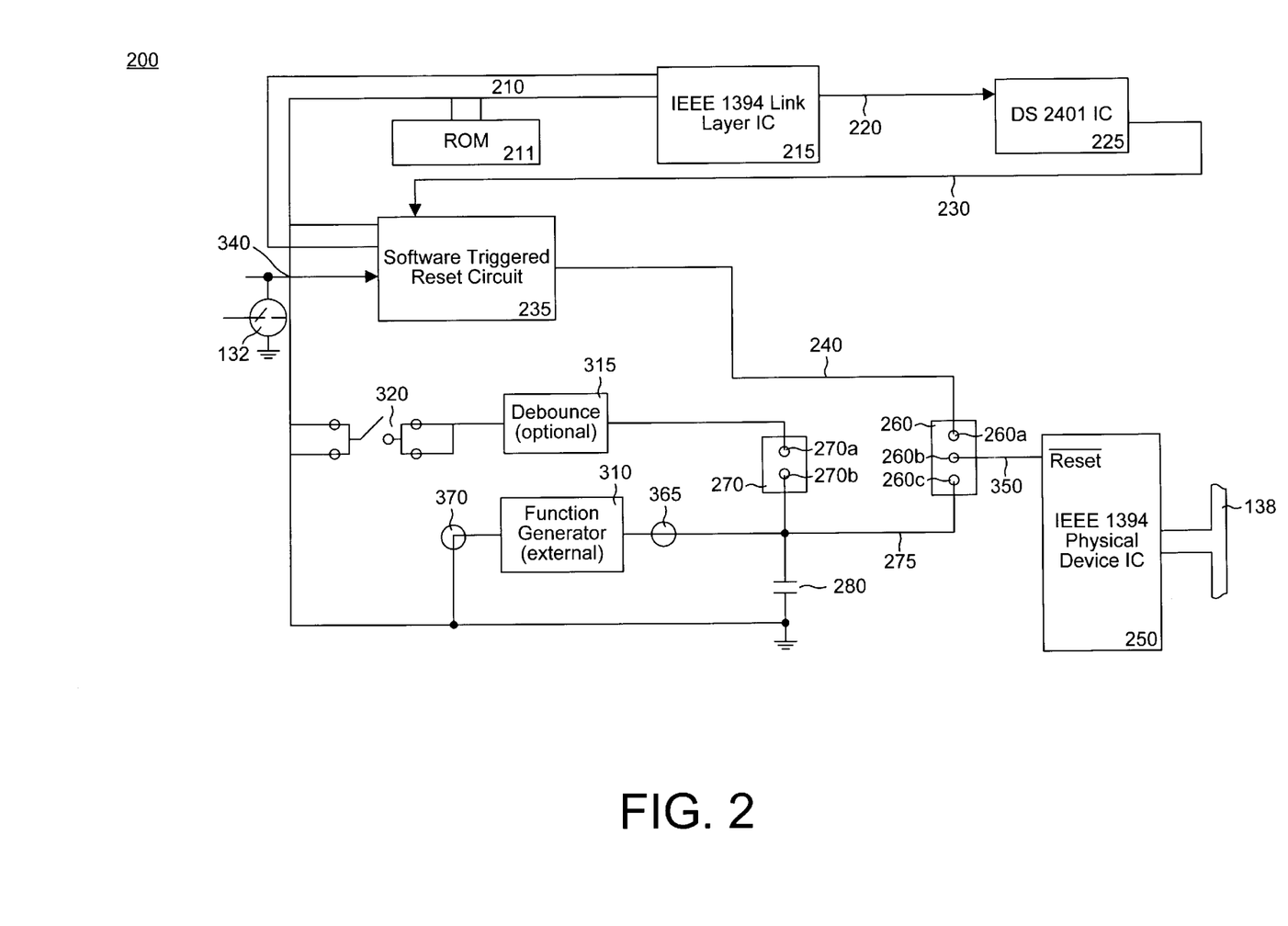
FIG. 2 illustrates the software triggered and hardware triggered reset circuitry used in accordance with the present invention for a serial device.

With reference to FIG. 2, a reset circuit 200 in accordance with the present invention is shown. In one embodiment, reset circuit 200 resides within the IEEE 1394 serial communication device 124 of FIG. 1. The reset signal line for resetting the IEEE 1394 serial communication device ("serial device") 124 is shown as reset signal line 350 and is supplied from a selector circuit 260 to an IEEE 1394 physical layer device integrated circuit 250 (known in the industry as a "PHY" circuit). In one embodiment, a reset signal of 100–200 milliseconds over line 350 is sufficient to cause reset to occur to serial device 124. The IEEE 1394 physical layer device IC 250 (PHY) can be of a number of well known designs. The IEEE 1394 physical layer device IC 250 is coupled to a serial communication bus 138. In one embodiment, the reset signal on line 350 is asserted low, but one of ordinary skill in the art appreciates that in alternative embodiments reset line 350 could also be asserted high.

The reset signal over line 350, when asserted, causes the serial device 124 to reset independently of the entire computer system 100. In certain cases, the serial device 124 automatically causes the PCI bus 112 (and all agents of the PCI bus 112) to reset. The reset signal applied to line 350 can originate from a number of sources in accordance with the present invention. Two major categories of reset within the present invention include a hardware category and a software category. The software triggered reset signals originate from software triggered reset circuit 235 which is discussed below in more detail with reference to FIG. 3. The hardware triggered reset category is discussed first.

By allowing reset signals from various origins, the present invention allows a mechanism for outside events to reset the serial device 124 (and in some cases the PCI bus 112) without needing to apply a system wide reset signal which would reset the entire computer system 110. In this way, other agents on the PCI bus 112, or processor 102, can trigger a reset of the serial device 124 through software. This is useful in cases where the serial device 124 is locked up but the computer system 100 is otherwise operating nominally. In these cases, a software triggered reset can be applied to reset serial device 124. Further, the present invention allows certain manual reset capabilities that are specially located on the serial device 124. These capabilities are useful during product development of the serial device 124. In one hardware reset mechanism, a push button is located on the serial device 124 that can be pressed by a developer to reset the serial device 124. In another hardware reset mechanism, a programmable reset pulse can be introduced to serial device 124 that facilitates a developer in locating the optimum reset pulse for the serial device 124 and for the PCI bus 112.

With reference to FIG. 2, the hardware category of reset signals is now discussed. The present invention provides a push button manual operated device 320 that is coupled to ground and coupled to an optional signal debouncing circuit 315. Signal debouncing circuit 315 can be of a number of well known designs. The debouncing circuit 315 is coupled to node 270a. In cases where the mechanical push button 320 pulls line 275 down for at least 20–300 milliseconds, debouncing is not typically needed and circuit 315 can be eliminated from reset circuit 200. Line 270 is coupled to node 260c, coupled to node 270b, coupled to input port 365 and also to coupled capacitor 280 which is coupled to ground. When using the mechanical push button 320 for providing a serial reset to IEEE physical layer device integrated circuit 250, selector circuit 270 (e.g., a jumper) is configured such that node 270a and node 270b are coupled together. It is appreciated that selector circuit 270 circuit, within the scope of the present invention, can be replaced with a number of different types of selector circuitry such as a memory cell controlled multiplexer circuit or a memory cell controlled pass gate.

In one embodiment, the mechanical push button 320 is board-mounted on the serial device 124 for convenience to developers. By providing a board-mounted push button 320 for resetting the serial device 124, the present invention facilitates development efforts on the work bench when serial device 124 becomes locked up and needs to be reset (along with PCI bus 112) without resetting the entire computer system 100. Further, different serial devices 124 can be swapped in and out of the PCI slot coupling to PCI bus 112, and then manually reset, without resetting the entire computer system 100.

When using the mechanical push button 320 for providing a serial reset to IEEE physical layer device IC 250, selector circuit 260 is configured such that node 260c and node 260b are coupled together and that node 260b and node 260a are not coupled together. In this configuration, the reset signal 350 is obtained from line 275. It is appreciated that within the present invention selector circuit 260 can be replaced with a number of different types of selector circuitry such as a memory cell controlled multiplexer circuit or a memory cell controlled pass gate circuit.

Two input ports or probes 370 and 365 of FIG. 2 are provided for receiving the positive and negative terminals of an external function generator 310. The external function generator can be programmed to supply a reset pulse of a programmable duration and/or of a programmable duty cycle to the reset circuit 200 of the present invention. When using signals from the external function generator 310 for providing a serial reset to IEEE physical layer device IC 250, selector circuit 270 is configured such that node 270a and node 270b are not coupled together. In this embodiment, the reset circuitry 200 of the present invention is not configured to allow the external function generator 310 and the manual push button 320 to be used simultaneously.

When using the external function generator 310 for providing a serial reset to IEEE physical layer device IC 250, selector circuit 260 is configured such that node 260c and node 260b are coupled together and that node 260b and node 260a are not coupled together.

Figure 4A:
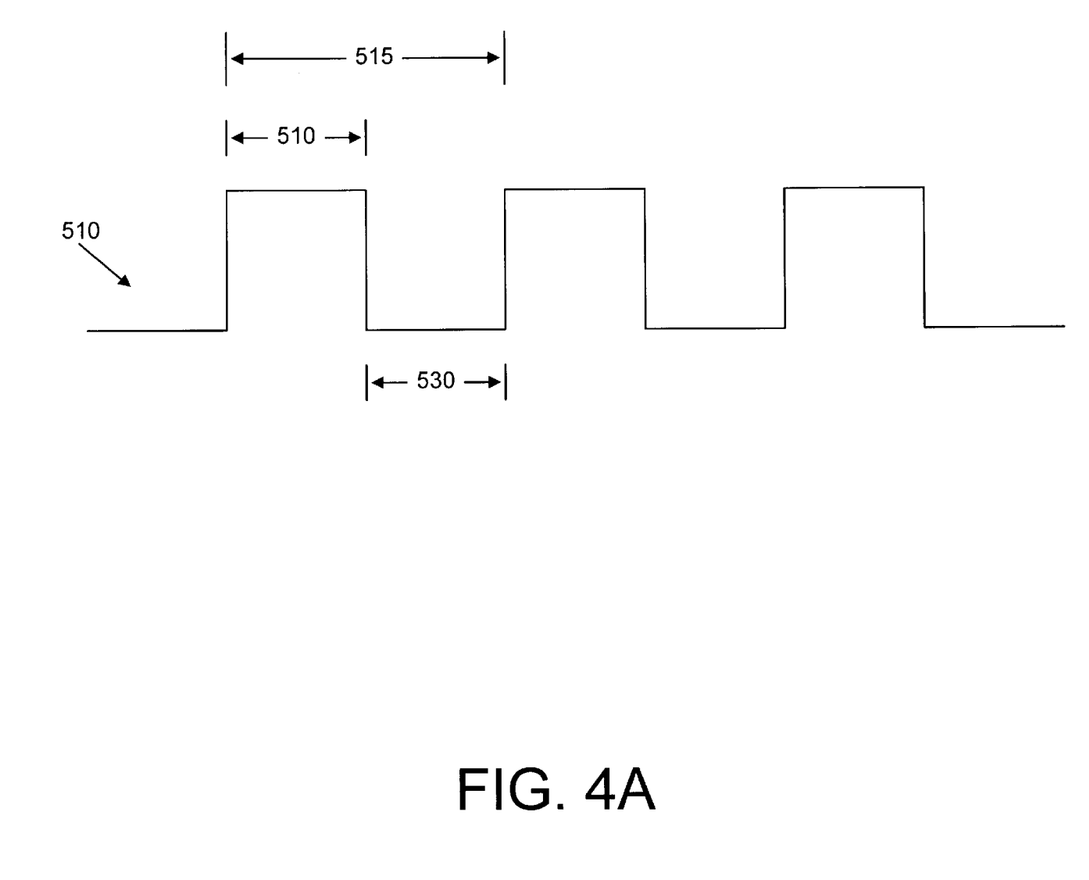
FIG. 4A is a timing diagram of a programmable reset signal generated by an external function generator in accordance with the present invention.

FIG. 4A illustrates an exemplary reset pulse train 515 generated by the external function generator 310 in accordance with the present invention. A pulse within pulse train 510 can have a programmable period 515 and also can have a programmable duty cycle, e.g., the ratio of the on time 520 to the off time 520 of a pulse. Within the present invention, any of a number of programmable external function generators can be used to supply pulse train 515 between input ports 370 and 365. In one embodiment, an RS233 function generator can be used as well as a number of function generators that are available from Hewlett Packard Instrumentation of Santa Clara, Calif.

Figure 4B:
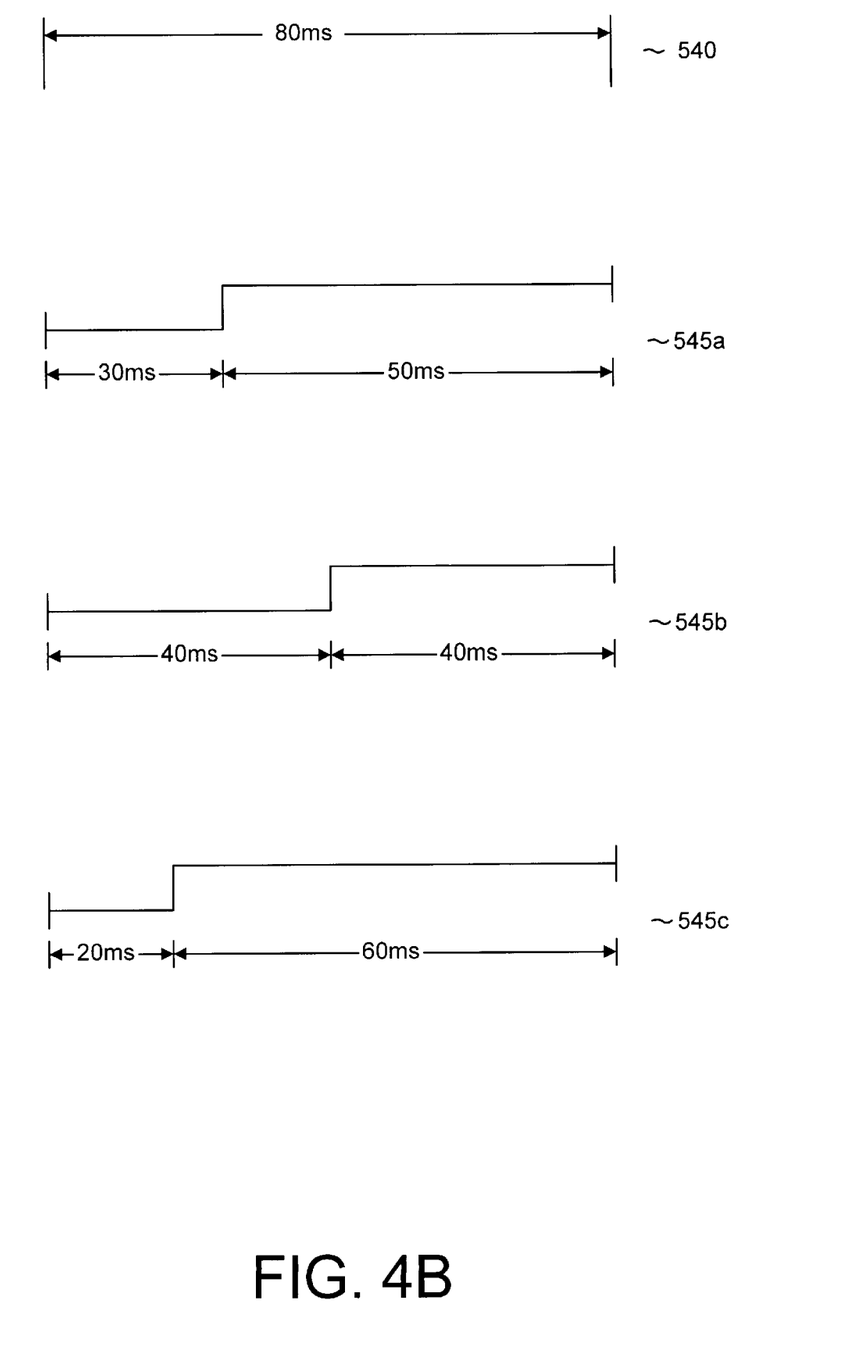
FIG. 4B illustrates a number of different reset duty cycles that can be generated by the function generator for performing optimum reset time characterization in accordance with the present invention.

FIG. 4B illustrates a number of different reset duty cycles that can be generated by the function generator 310 for performing optimum reset time characterization in accordance with the present invention. Pulse 540 represents an exemplary clock cycle of 80 ms in length. Pulse 545a represents an exemplary duty cycle of 30 ms low and 50 ms high. Pulse 545b represents an exemplary reset duty cycle of 40 ms low and 40 ms high (50%). Pulse 545c represents an exemplary reset duty cycle of 20 ms low and 60 ms high. The provision of the pair of input ports 370 and 365 and function generator 310 in the configuration of FIG. 2 allows a user to adjust the function generator 310 until an optimum reset duty cycle is discovered.

It is appreciated that the provision of a pair of input ports 370 and 365 for allowing an external function generator 310 to provide a reset pulse is useful during product development so that optimal reset pulse length and shape can be determined. In certain circumstances, the function generator 310 applies a programmable reset pulse to the physical layer device IC 250. The physical layer device IC 250, when reset, causes agents connected on the IEEE 1394 serial bus to reset and this causes the IEEE 1394 bus to reset. Other monitors within computer system 100 can be used to report whether nor not the applied signal was sufficient to cause a reset on the physical layer device IC 250. The function generator 310 can be made to increase or decrease the reset pulse period and/or the duty cycle so that a sufficient pulse is achieved that causes a reset on the physical layer device IC 250.

Another hardware reset option is available to reset line 350 that originates from the system reset button 132 of FIG. 1 and FIG. 2. If this system wide reset button 132 is pushed, then computer system 100 is reset along with the serial device 124 (e.g., a hard reset is activated). The system wide reset button 132 pulls down line 340 which is an input provided to software triggered reset circuit 235. Line 340 is also controlled by processor 102. As will be described with respect to FIG. 3, when line 340 is pulled down, a signal is asserted over line 240 which causes the physical layer device integrated circuit 250 to become reset. In this case, the serial device 124 is reset along with the remainder of computer system 100. When using the system wide reset push button 132 for providing a serial reset to IEEE physical layer device integrated circuit 250, selector circuit 260 is configured such that node 260a and node 260b are coupled together and that node 260b and node 260c are not coupled together.

Figure 3:
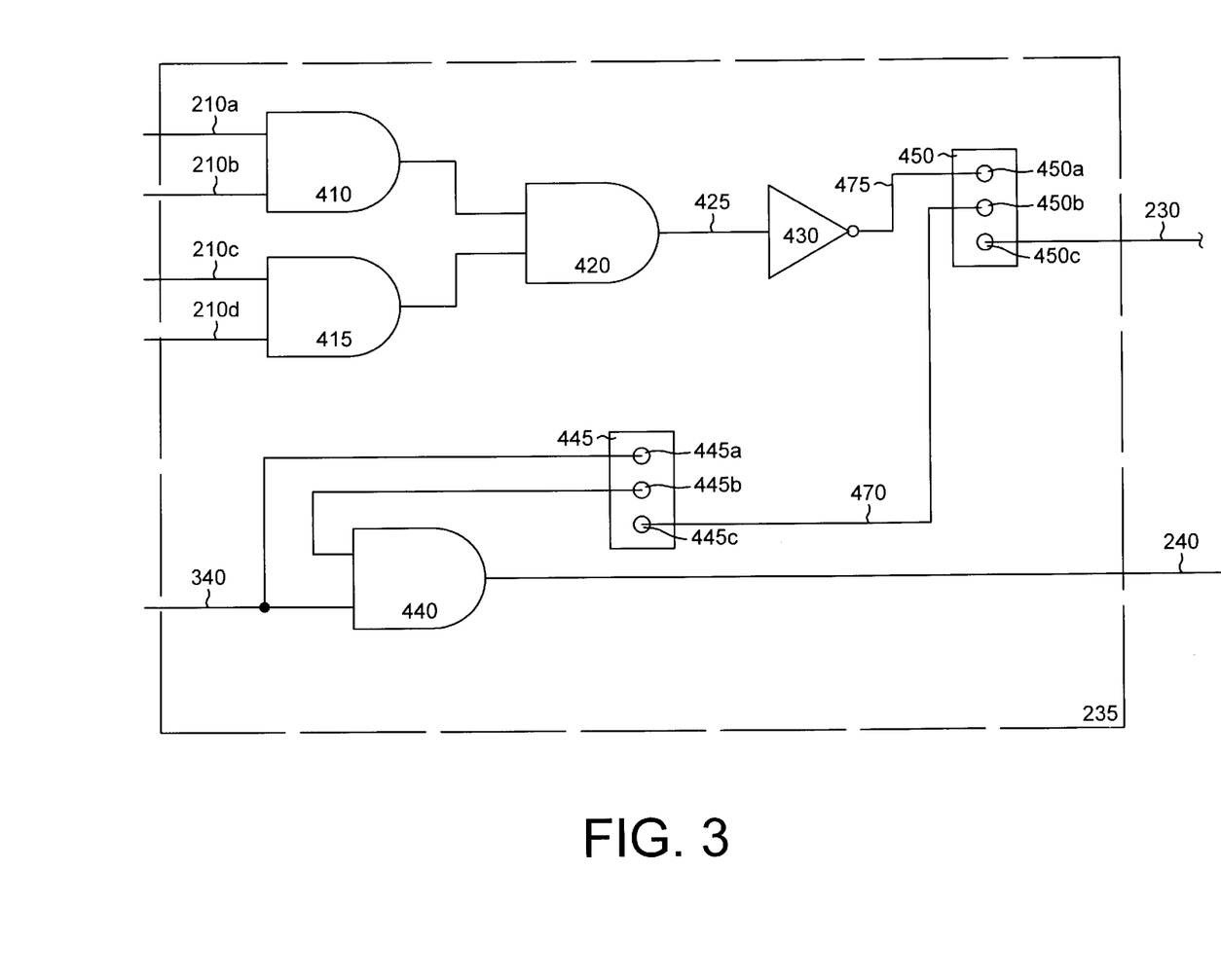
FIG. 3 illustrates circuitry of the software triggered reset circuitry used in accordance with the present invention.

Reference is now made to FIG. 2 and FIG. 3 to describe the software triggered reset modes of the present invention. Within reset circuit 200, an IEEE 1394 link layer integrated circuit (IC) device 215 and a device identification circuit 255 (e.g., a specialized pattern recognizer circuit) are provided. Although a number of bit stream recognizers can be used in accordance with the present invention, one exemplary circuit is the DS2401 integrated circuit available from Dallas Semiconductor of Dallas, Tex. The IEEE link layer integrated circuit 215 generates address lines 210 which are used for accessing certain read only memory (ROM) locations within serial device 124 and these address lines are controlled via software. A portion of these address lines are coupled to the software triggered reset circuit 235.

In the embodiment shown in FIG. 3, four of these address lines 210a–210d are used. These four address lines 210a–210d originate from an external ROM link 211 and do not originate from the DS2401 integrated circuit 225. These four address lines 210a–210d define a predefined address range within the serial device 124. Software controlled memory accesses within this predetermined range automatically cause software triggered reset circuit 235 to generate a reset pulse over line 240 for resetting the physical layer device integrated circuit 250.

Alternatively, the processor 102, via application software control, can assert a system wide reset over line 340. In this case, regardless of the state of any other reset signals, software triggered reset circuit 235 generates a reset pulse over line 240 for resetting the physical layer device integrated circuit 250. Any of a number of well known mechanisms can be used to cause processor 102 to generate a system wide reset via software control. Typically programs stored in memory unit 104 contain certain routines or instructions that when executed cause processor 102 initiate a system wide reset.

Alternatively, the software triggered reset circuit 235 can cause a reset signal over line 240 in response to a reset signal detected over line 230. The IEEE link layer IC device 215 can generate, under software control, a particular device identification over line 220. In one embodiment, the device identification is a bit stream of approximately 60–100 bits in length (but the size can vary within the scope of the present invention). The IEEE 1394 link layer circuit 215 is coupled to the device identification circuit 225 via line 220. Under software control, a particular pre-defined bit pattern (e.g. a reset pattern) can be inserted into the device identification bit pattern by IEEE 1394 link layer circuit 215 and transmitted over line 220. When this predefined reset bit pattern is detected by the device identification circuit 225, it generates a reset signal (asserted low in one implementation) over line 230 thereby causing a software generated reset of the serial device 124.

It is appreciated that when using the device identification reset mode or the address range reset mode, as described above, selector circuit 260 is configured such that node 260a and node 260b are coupled together and that node 260b and node 260c are not coupled together.

FIG. 3 illustrates the circuitry of the software triggered reset circuit 235 in more detail. Two of the address lines 210a and 210b (from bus 210 of FIG. 2) are supplied to AND gate 410. Two other of the address lines 210c and 210d (from bus 210 of FIG. 2) are supplied to AND gate 415. The output of AND gate 410 and the output of AND gate 415 drive AND gate 420. In this configuration, the output on line 425 is high only when signals over all of the address lines 210a–210d are high. The output 475 of inverter 430 is therefore low in this situation. This is shown in the timing diagrams of FIG. 5. Signal 610 corresponds to address line 210a, signal 615 corresponds to address line 210b, signal 620 corresponds to address line 210c, and signal 625 corresponds to address line 210d. Signal 630 corresponds to line 475. When pulses 610a–625a are high, the output of inverter 430, as shown by signal 630, is low (pulse 630a) to generate a reset pulse for this address range.

The output line 475 is coupled to node 450a of selector circuit 450. Node 450b of selector circuit 450 is coupled to node 445c of selector circuit 445. It is appreciated that selector circuits 450 and 455 can be replaced with a number of different types of selector circuitry such as memory cell controlled multiplexer circuits or memory cell controlled pass gate circuits, within the scope of the present invention. The input line 230 is coupled to node 450c of selector circuit 450. When controlling the reset line 350 to the physical layer device 250 from an address range triggered reset, selector circuit 450 is configured such that node 450a and node 450b are coupled and node 450b is not coupled to node 450c and further that node 445c of selector circuit 445 is coupled to node 445b and nodes 445a and 445b are not coupled. In this configuration, the pulse 630a (FIG. 5) causes the reset line 350 to drop low as shown by pulse 650a. Signal 650 corresponds to the reset line 350.

The device identification reset line 230 (FIG. 3) is coupled to node 450c of selector circuit 450. When controlling the reset line 350 to the physical layer device 250 from a device identification reset, selector circuit 450 is configured such that node 450b and node 450c are coupled and node 450a is not coupled to node 450b and further that node 445c of selector circuit 445 is coupled to node 445b and nodes 445a and 445b are not coupled. Signal 640 of FIG. 5 corresponds to the device identification reset line 230. In this configuration, the pulse 640a causes the reset line 350 to drop low as shown by pulse 650b.

Figure 5:
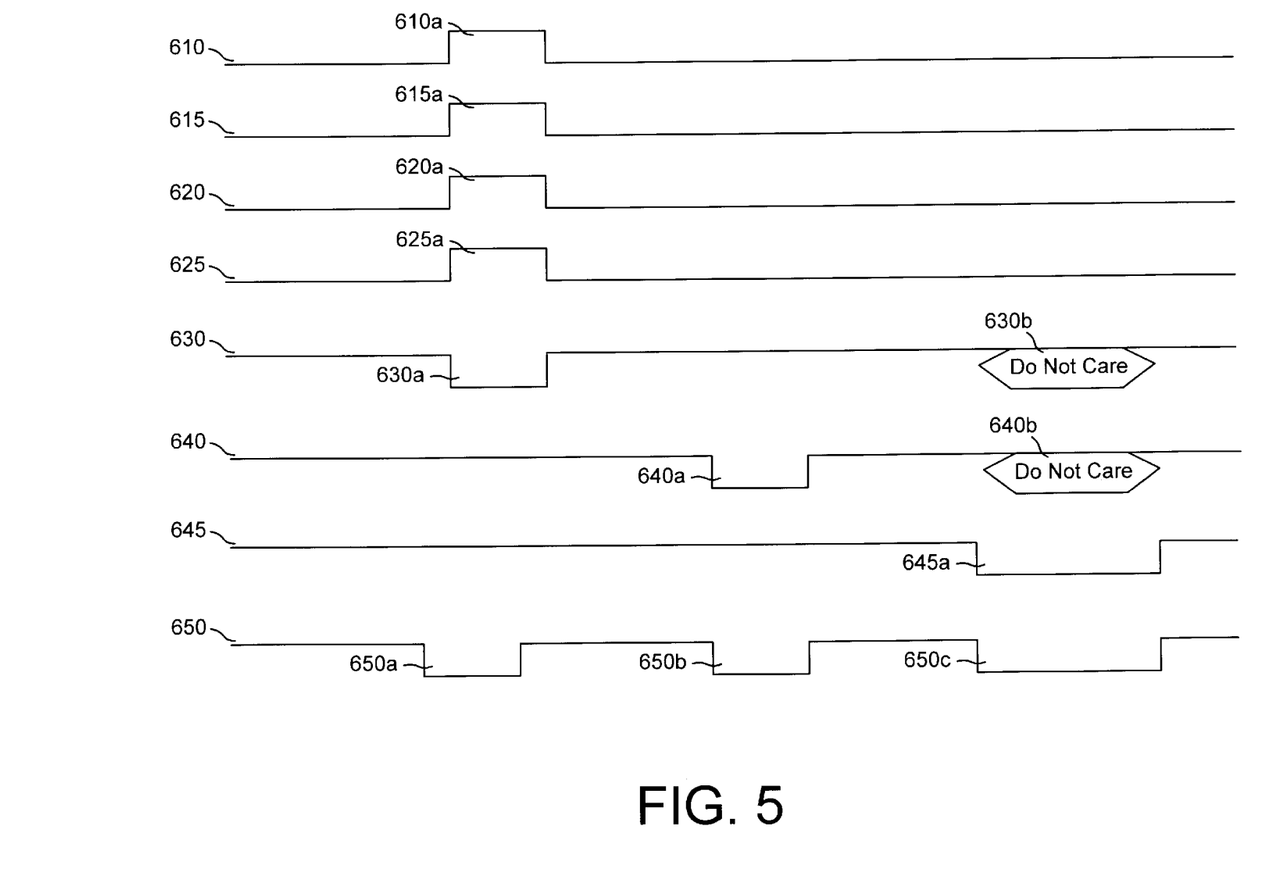
FIG. 5 is a timing diagram illustrating signals used by the reset circuitry of the present invention.

The system wide reset line 340 of FIG. 3 is coupled to one input of AND gate 440 and also coupled to node 445a of selector circuit 445. Node 445b of selector circuit 445 is coupled to an input of AND gate 440. When nodes 445c and 445b are coupled together (and nodes 445b and 445a are not coupled), the system wide reset 340 overrides any software generated reset signals from line 470. This is shown in FIG. 5. For instance, signal 645 corresponds to the system wide reset signal line 340. When this line 340 is low, at pulse 645a, the reset line 350 is low (pulse 650c) regardless of the value of line 630 and line 640, as shown by regions 630b and 640b. When nodes 445b and 445a are coupled together (and nodes 445b and 445c are not coupled), then the address range reset mode and the device identification reset modes are disabled. In this configuration, line 350 responds only to signals over the system wide reset line 340 and will drop low when line 340 drops low. As described above, the system wide reset line 340 can be controlled by the processor 102 and by a manual push button 132.

The present invention, as described above, provides circuitry for allowing three different types of software initiated resets to reset serial device 124. Further, the present invention also provides three different hardware initiated resets for resetting serial device 124. As such, the present invention provides numerous channels by which the serial device 124 can be automatically reset (e.g., by software control) without requiring that the computer system 100 be entirely reset simultaneously therewith. Further, the present invention offers several hardware reset mechanisms that provide facilitate the work of developers by allowing them a mechanism for determining an optimum reset pulse and also by allowing them a device-mounted mechanism for quickly resetting the serial device 124 on the work bench. The reset circuitry 200 of the present invention greatly facilitates the ability for serial cards to be swapped in and out of PCI slots of computer system 100 without requiring the computer system 100 to be entirely reset.

The preferred embodiment of the present invention, a reset circuit for resetting an IEEE 1394 serial communication device within a computer system, is thus described. While the present invention has been described in particular embodiments, it should be appreciated that the present invention should not be construed as limited by such embodiments, but rather construed according to the below claims.

What is claimed is:

1. A reset circuit comprising:
   a first manual operated device operable to assert a first reset signal to reset a serial communication device and mounted thereon;
   a pair of input ports, mounted on said serial communication device and coupled to a first selector circuit, said ports operable to accept a programmable reset pulse of programmable duration and programmable duty cycle, said programmable reset pulse resetting said serial communication device;
   a second selector circuit operable to couple and decouple said first reset signal to and from said first selector circuit, wherein said first selector circuit is coupled to reset a physical communication layer circuit of said serial communication device; and
   a circuit operable to generate a software reset signal in response to a software triggered event and coupled to said first selector circuit, wherein said serial communication device is configured to reset a serial communication bus.

2. A reset circuit as described in claim 1 wherein said circuit operable to generate a software reset signal comprises:
   a device identification circuit operable to receive a sequence of bits representing a device identification and, in response to detecting a predefined pattern within said sequence of bits, operable to also generate a second reset signal;
   an address range detector circuit operable to generate a third reset signal in response to a memory access within a predefined address range; and
   a third selector circuit operable to receive said second reset signal, said third reset signal and a system reset signal and in response thereto operable to generate said software reset signal.

3. A reset circuit as described in claim 2 further comprising a computer system coupled to said serial communication device, wherein said system reset signal is generated by a processor of said computer system and wherein said system reset signal resets said computer system.

4. A reset circuit as described in claim 2 further comprising a computer system coupled to said serial communication device, wherein said system reset signal is generated by a second manual operated device of said computer system and wherein said system reset signal resets said computer system.

5. A reset circuit as described in claim 1 wherein said first manual operated device is a push button device.

6. A reset circuit as described in claim 1 further comprising a function generator coupled to said pair of input ports, said function generator operable to generate said programmable reset pulse.

7. A reset circuit comprising:
   a first manual operated means for asserting a first reset signal to reset a serial communication device and mounted thereon;

a pair of input means, mounted on said serial communication device and coupled to a first selector means, said input means for accepting a programmable reset pulse of programmable duration and duty cycle, said programmable reset pulse resetting said serial communication device;

a second selector means for coupling and decoupling said first reset signal to and from said first selector means, wherein said first selector means is coupled to reset a physical communication layer circuit of said serial communication device; and means for generating a software reset signal in response to a software triggered event and coupled to said first selector means, wherein said serial communication device is configured to reset a serial communication bus.

8. A reset circuit as described in claim 7 wherein said means for generating a software reset signal comprises:

a device identification means for receiving a sequence of bits representing a device identification and, in response to detecting a predefined pattern within said sequence of bits, for also generating a second reset signal;

an address range detector means for generating a third reset signal in response to a memory access within a predefined address range; and a third selector means for receiving said second reset signal, said third reset signal and a system reset signal and in response thereto for generating said software reset signal.

9. A reset circuit as described in claim 7 further comprising a function generator means coupled to said pair of input ports, said function generator means for generating said programmable reset pulse.

10. A computer system comprising:

a processor coupled to communicate with a host bus;

a serial communication device coupled to said host bus and coupled to a serial communication bus, said serial communication device having a physical communication layer device and having a reset circuit, said reset circuit comprising:

a first manual operated device for asserting a first reset signal to reset said serial communication device and mounted on said serial communication device;

a pair of input ports mounted on said serial communication device and coupled to a first selector circuit for accepting a programmable reset pulse of programmable duration and programmable duty cycle, said programmable reset pulse for resetting said serial communication device;

a second selector circuit for coupling and decoupling said first reset signal to and from said first selector circuit, wherein said first selector circuit is coupled to reset said physical communication layer device; and a circuit for generating a software reset signal in response to a software triggered event, said circuit coupled to said first selector circuit, wherein said serial communication device is configured to reset said serial communication bus.

11. A computer system as described in claim 10 wherein said circuit for generating a software reset signal comprises:

a device identification circuit for receiving a sequence of bits representing a device identification and, in response to detecting a predefined pattern within said sequence of bits, for generating a second reset signal;

an address range detector circuit for generating a third reset signal in response to a memory access within a predefined address range; and a third selector circuit for receiving said second reset signal, said third reset signal and a system reset signal and in response thereto for generating said software reset signal.

12. A computer system as described in claim 11 wherein said system reset signal is generated by said processor of said computer system and wherein said system reset signal resets said computer system.

13. A computer system as described in claim 11 further comprising a second manual operated device coupled to said a computer wherein said system reset signal is generated by said second manual operated and wherein said system reset signal resets said computer system.

14. A computer system as described in claim 10 wherein said first manual operated device is a push button device.

15. A computer system as described in claim 10 further comprising a function generator coupled to said pair of input ports, said function generator for generating said programmable reset pulse.

16. A computer system as described in claim 10 wherein said host bus is a peripheral components interface (PCI) bus.

17. A computer system as described in claim 10 wherein said serial communication device is an IEEE 1394 standard serial communication device.

18. A computer system comprising:

a processor coupled to a peripheral component interconnect (PCI) bus;

an IEEE 1394 serial communication device coupled to said PCI bus and coupled to a serial communication bus, said IEEE 1394 serial communication device having a physical communication layer circuit and having a reset circuit, said reset circuit comprising:

a first manual operated device for asserting a first reset signal to reset said IEEE 1394 serial communication device and mounted on said IEEE 1394 serial communication device;

a pair of input ports mounted on said IEEE 1394 serial communication device and coupled to a first selector circuit for accepting a programmable reset pulse of programmable duration and programmable duty cycle, said programmable reset pulse for resetting said IEEE 1394 serial communication device;

a second selector circuit for coupling and decoupling said first reset signal to and from said first selector circuit, wherein said first selector circuit is coupled to reset said physical communication layer circuit; and a circuit for generating a software reset signal in response to a software triggered event, said circuit coupled to said first selector circuit, wherein said IEEE 1394 serial communication device is configured to reset said serial communication bus.

19. A computer system as described in claim 18 wherein said circuit for generating a software reset signal comprises:

a device identification circuit for receiving a sequence of bits originating from a link layer circuit, said sequence of bits representing a device identification, said device identification circuit for generating a second reset signal in response to detecting a predefined pattern within said sequence of bits;

an address range detector circuit for generating a third reset signal in response to a memory access within a predefined address range; and a selector circuit for receiving said second reset signal, said third reset signal and a system reset signal and in response thereto for generating said software reset signal.

20. A computer system as described in claim 19 wherein said system reset signal is generated by said processor of said computer system and wherein said system reset signal resets said computer system.

21. A computer system as described in claim 19 further comprising a second manual operated device coupled to said a computer wherein said system reset signal is generated by said second manual operated and wherein said system reset signal resets said computer system.

22. A computer system as described in claim 18 wherein said first manual operated device is a push button device.

23. A computer system as described in claim 18 further comprising a function generator coupled to said pair of input ports, said function generator for generating said programmable reset pulse.

* * * * *